United States Patent
Himberg et al.

(10) Patent No.: US 6,912,386 B1
(45) Date of Patent: Jun. 28, 2005

(54) METHOD FOR CONTROLLING OPERATION OF A MOBILE DEVICE BY DETECTING USAGE SITUATIONS

(75) Inventors: Johan Himberg, Helsinki (FI); Heikki Mannila, Espoo (FI); Kalle Korpiaho, Espoo (FI); Hannu T.T. Toivonen, Helsinki (FI); Johanna Tikanmäki, Espoo (FI)

(73) Assignee: Nokia Corporation, Espoo (FI)

( * ) Notice: Subject to any disclaimer, the term of this patent is extended or adjusted under 35 U.S.C. 154(b) by 285 days.

(21) Appl. No.: 10/081,984

(22) Filed: Nov. 13, 2001

(51) Int. Cl.[7] .............. H04Q 7/20; H04M 3/00; H04M 1/00; H04B 17/00

(52) U.S. Cl. ............ 455/423; 455/425; 455/418; 455/67.11; 455/550.1

(58) Field of Search ................ 455/423, 424, 455/425, 418, 419, 67.11, 67.14, 159.1, 171.1, 181.1, 184.4, 226.1, 227, 550.1, 566; 340/517, 521, 522, 523, 539.26, 539.27, 529.28, 514–516, 539.22, 540

(56) References Cited

U.S. PATENT DOCUMENTS

| | | | | |
|---|---|---|---|---|
| 4,823,290 A | * | 4/1989 | Fasack et al. .............. 364/550 |
| 5,081,707 A | * | 1/1992 | Schorman et al. .......... 455/186 |
| 5,159,315 A | | 10/1992 | Schultz et al. | |
| 5,579,535 A | | 11/1996 | Orlen et al. ................ 455/33.1 |
| 5,848,397 A | | 12/1998 | Marsh et al. ................ 705/14 |
| 5,910,765 A | * | 6/1999 | Slemon et al. .............. 340/517 |
| 5,910,797 A | | 6/1999 | Beuk .......................... 345/157 |
| 6,157,814 A | | 12/2000 | Hymel et al. .............. 455/31.1 |
| 6,282,713 B1 | | 8/2001 | Kitsukawa et al. ........... 725/36 |
| 6,564,127 B1 | * | 5/2003 | Bauerle et al. ................ 701/33 |
| 6,621,413 B1 | * | 9/2003 | Roman et al. ......... 340/539.12 |
| 2001/0005845 A1 | | 6/2001 | Azuma | |
| 2001/0013013 A1 | | 8/2001 | Takenaga | |

OTHER PUBLICATIONS

PCT International Search Report, International Application No. PCT/IB02/04701, Date of Completion of Search —Feb. 28, 2003, Sheet 1, Continuation of First Sheet and Sheet 2.

* cited by examiner

*Primary Examiner*—William Trost
*Assistant Examiner*—Meless Zewdu
(74) *Attorney, Agent, or Firm*—Morgan & Finnegan, L.L.P.

(57) ABSTRACT

A mobile communication device, such as a mobile telephone, may be equipped with sensors for monitoring acceleration, noise level, luminosity and humidity. During a learning phase in the operation of the device, data from the sensors may be stored and associated with particular time segments. Usage of the device is monitored during the learning phase and associated with the sensor data. If a pattern of usage is detected for certain sensor levels, a rule for future similar situations is recognized and stored by the device. In a usage phase, the stored rules are applied to change a user interface of the device when similar future situations are encountered. The learning and usage phases of the device may overlap.

37 Claims, 3 Drawing Sheets

METHOD FOR CONTROLLING OPERATION OF A MOBILE DEVICE BY DETECTING USAGE SITUATIONS

TECHNICAL FIELD OF THE INVENTION

The present invention relates generally to a method for controlling operation of a mobile device based on its usage situation, and relates more specifically to a method for correlating sensor data, user operations and usage situations.

BACKGROUND OF THE INVENTION

Most mobile devices, such as mobile telephones, have a multitude of different options and functionalities available for the user of said device. For example, a user of the mobile device can typically select stored telephone numbers for dialing, change the ringing volume of the device, change the luminosity of a display of the device, and the like. Such options and functionalities are typically presented and manually selectable through a programmed user interface utilized by the device.

Prior solutions for controlling the operations of a mobile device include manual control by the user according to the usage situation or the straight forward use of a single sensor condition, such as automatic display lighting if the level of ambient light is low or automatic audio volume setting according to the surrounding noise level monitored by a microphone.

However, it would be advantageous if such a device could more readily and automatically adapt to external conditions based on a multitude of sensor data. Thus, there is a need for efficient gathering and use of context-awareness data in mobile communications, where communication situations may vary significantly.

BRIEF SUMMARY OF THE INVENTION

According to one embodiment of the present invention, a method for controlling the user interface of a mobile communication device, such as a mobile telephone, having at least one sensor includes: (1) storing analog-or digital sensor signals indicative of a plurality of external conditions over a period of time, (2) segmenting said sensor signals into a sequence of sensor data segments, such as by time series segmentation, (3) storing an indication of an operation performed by the user during at least one of said sensor data segments, and (4) determining a rule for future operation of the device, the rule corresponding to said sensor data segments and the operation. The rule may be stored in a rule database in a memory of the device. The segmenting of sensor signals may be perfomed substantially in real time with said storing the sensor signals. The segmenting may be performed after a predetermined amount of sensor signals are stored.

According to a further embodiment of the present invention, a method for controlling the user interface of a mobile communication device includes the further steps of detecting a plurality of external conditions, searching a rule database to find a rule matching the external conditions, and performing a function corresponding to the rule.

According to various embodiments of the present invention, the rule may correspond to a change in a user interface.

According to still further embodiments of the present invention, a rule for operation may be downloaded from an external source, such as by wireless communication from a computer server.

According to still further embodiments of the present invention, the external conditions monitored by the sensors may include a detected acceleration, a noise level, a luminosity and a humidity.

BRIEF DESCRIPTION OF THE DRAWINGS

In the following, the invention will be described in more detail with reference to the appended figures, showing typical applications of the method described in the present invention.

DETAILED DESCRIPTION OF THE INVENTION

Figure 1:
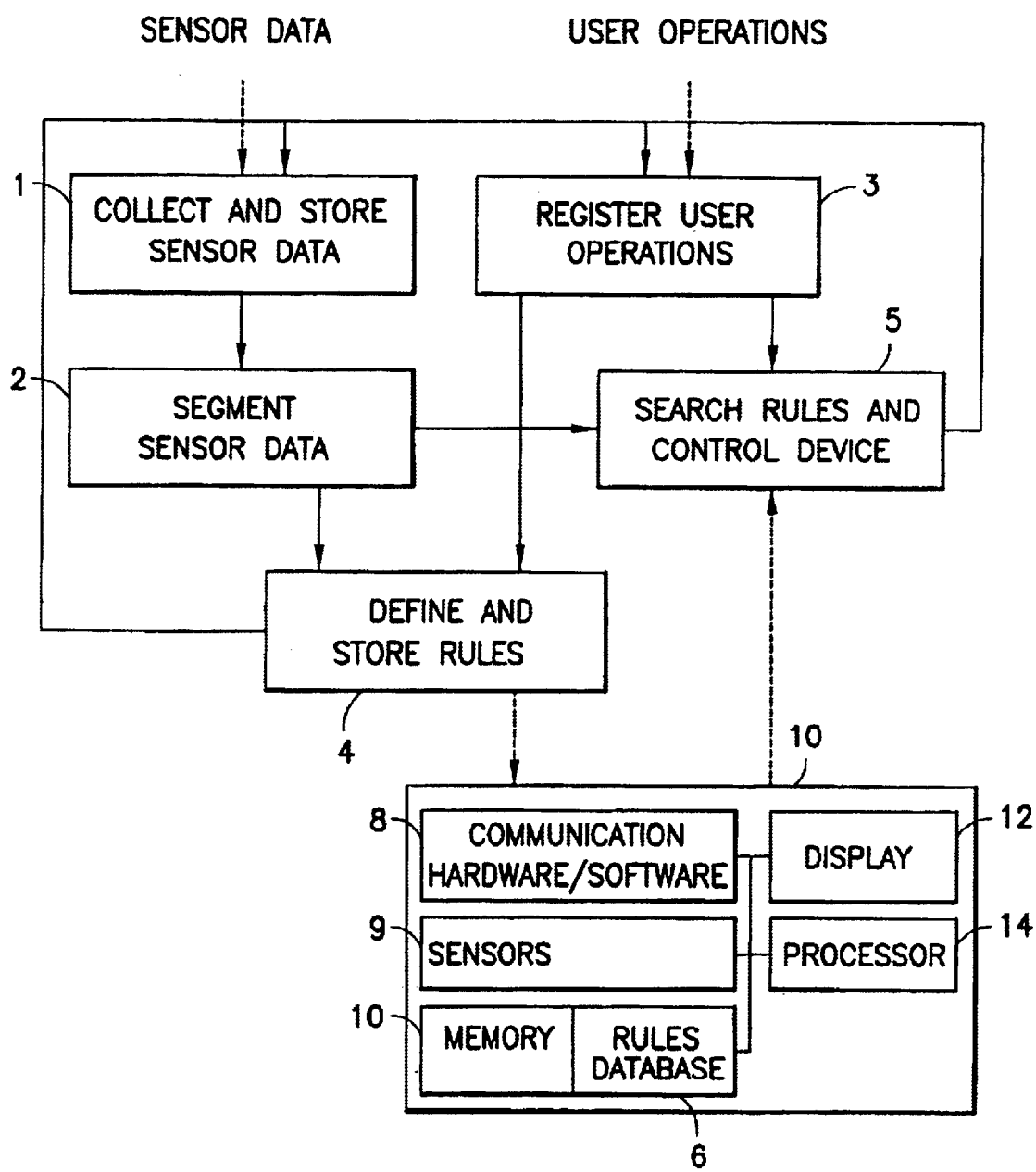
FIG. 1 is a depiction of an exemplary device and an exemplary process for determining rules employed by the device, according to certain embodiments of the present invention.

A mobile device of the present invention includes one or more sensors that are capable of determining various information about the context of the device and the user's current environment. Said sensor(s) can be, for example, acceleration, noise level, luminosity and humidity sensors. The sensors can be used to monitor the external physical conditions, the user himself or some actions of the user. The present invention provides a method for exploiting the information provided by said sensors. The information can be used 1) for controlling the operations of the mobile device and 2) for indexing and organizing the sensor data for user interfaces, retrieval and analysis. Examples of such include 1) launching applications according to a certain context, e.g., setting the phone to a silent mode in a concert or retrieving time-table information for public transportation, and 2) indexing information for recall using context-specific terminology, e.g., "Show incoming calls while walking at a railway station."

In the present invention, time-series segmentation is used to divide sensor data into non-overlapping, internally homogeneous segments. The segments that are found reflect certain states where the device, and its user, are. Compact representations of the recognized segments are used as templates against which the actions of the user (e.g. phone calls) are compared, so that prediction of future actions becomes possible. Formally, the segmentation problem is a special case of general clustering problem, but the temporal structure of the data provides additional restrictions that can be used to speed up the computations.

The method described in the present invention describes an effective and sophisticated way of utilizing data from one or more sensors that detect a plurality of external conditions in order to control the operations of a mobile device, thus rendering it context-aware and greatly enhancing its usability.

The sensor data segmented by the device may be raw sensor data, that is, data received directly from the sensor, or pre-processed sensor data, in which the data is first processed to render it in more useful form. In considering data from a luminosity sensor, for example, the raw sensor data may be pre-processed using a Fourier transform or the like to generate a frequency spectrum, which then may be segmented within the scope of the present invention. In such a case, the pre-processed luminosity sensor data may be used to more accurately determine, based on the frequency spectrum, whether detected ambient light is natural or artificial, corresponding to a user being inside or outdoors. Furthermore, such pre-processed sensor data may be more readily compressed, thereby decreasing the amount of time needed to later process or perform calculations using such data. Any combination of raw and preprocessed sensor data may likewise be used.

Recognizing the context of use in more detail is important in making mobile devices as simple to use as possible. Recognition of the user's situation can be used to provide an adaptive and personalized user interface. The use of sensors in a mobile device to determine the context of the device and user is not solved merely by adding said sensors to said devices. To infer more precise and usable information of said context demands for use of different types of sensors to be used and larger amounts of data to be collected. To be able to use this data efficiently, it has to be processed efficiently to infer usable information and to yield a usable compressed representation of the data.

The present invention describes a method for dividing sensor data into non-overlapping, internally homogenous segments which are found to reflect different states of the mobile device. By collecting sensor data in different usage situations, processing the data by dividing it into said segments, and then correlating said segments with corresponding usage situations and user operations, it is possible for the device to recognize the relationships between sensor data and context. After this learning phase, the device can infer its context by collecting real-time sensor data, segment the data, and detect its usage situation according to the learned correspondence between the segments and usage situations. Furthermore the device can initiate or predict operations on said device based on the previous or learned correspondences between sensor data segments, usage situations and typical user operations in those usage situations. In this way information about the context of, say, a mobile phone can be used to improve the user interface. For example, if we know from the context that the user is running, the font used in the display can be made larger.

The method described in the present invention is especially well suited for communication mobile devices, such as mobile telephones. Successful human communication is typically contextual. Communication varies depending on with the user is communicating, where the user is located, what time it is, whether other people are in proximity of the user, what usage situations have occured in the past, and the like. Accordingly, there is a lot of context information that can be used from every-day experiences of the user. The need for context-awareness is especially large in mobile communications, where the communication situations can vary significantly.

In the present invention a method for achieving said context awareness is described based on time series segmentation of sensor data in context recognition for mobile devices. An implementation for the time series segmentation of the sensor data is described that gives approximately optimal results in a fraction of the time required by dynamic programming. This implementation can be used to solve the segmentation problem in time O(kN) with very small constants as contrasted with that of dynamic programming $O(kN^2)$. Where as dynamic programming can be used to find segmentations that minimize the intra-segment variances, the implementation described in the present invention entails, for some instances of the segmentation problem, a less-than-optimal solution but is faster and sufficient for the end result for the segmentation problem as described in the present invention.

The present invention describes a method for controlling the user interface operation of a mobile device by modifying the device's user interface according to previously detected and analysed usage situations of the user.

Referring to FIG. 1, the mobile device 10 includes communication hardware and software 8 for implementing mobile communications functions, one or more sensors 9 and a memory 7 for storing both processing instructions that enable the functionality described herein and a rules database 6 for storing rules of operation together with a display 12 for presenting a user interface for selecting a plurality of operations and a processor 14 for, among other things segmenting sensor signals into a time sequence of data segments, as described further below.

The device 10 may operate generally according to the following method. One or more sensors 9 built into the mobile device 10 are used to collect and store ambient sensor signals as either analog or digital data (step 1). The sensor data is segmented rendering a representation of the signal as a sequence of sensor data segments (step 2). User operations are registered and correlated to the collected sensor data (step 3). Rules of use based on the correlation are determined and stored in a rules database 6 in said mobile device 9 based on the sensor data segments and consistent user operations performed on the mobile device in said segments (step 4). This step can also include the recognition of consistent occurrence of certain subsequences of segments in said sequence of sensor data segments. Finally, the device 10 may continuously search said rules database to find a matching sequence of sensor segments and user operations in order to determine whether the user interface of said mobile device is to be modified in order to reflect settings of said device in that particular situation identified by the rule found reflecting the existence of said previously detected and analysed usage situation (step 5).

The control of the user interface of a mobile device includes controlling the operations of the mobile device by initiating or predicting operations and indexing and organizing the sensor data for user interfaces, retrieval and analysis.

The step of segmenting sensor data can be implemented so that the collected sensor signals are segmented in real time or segmented after a certain amount of data is collected and stored.

The rules in the rules database 6 describe consistent user operations on said mobile device 10 occuring in a certain sensor data segment. Furthermore, the rules describe sequences of sensor data segments that consistently occur dependently of each other and user operations on said mobile device occuring in the segments of said sequence of sensor data segments.

A method for controlling operation of a mobile device 10 described in the present invention may include two phases: 1) a learning phase wherein sensor data is stored, user operations are detected and logged, sensor data is segmented and rules are defined based on a correlation of the user operations and the sensor data, and 2) a usage phase wherein sensor data is monitored to determine conditions relevant to implementing a stored rule, retrieving the rule from the rule database when the condition is detected, and implementing the operation in accordance with the rule. The rule may include, for example, dimming the display in dark luminosity conditions, displaying a larger font when the user is moving, or other similar changes to the user interface.

The two phases described above can be sequential so that the operation is first learned before being implemented. Alternatively, a predetermined rule may downloaded into it from an external source. Furthermore these phases can run concurrently or in parallel so that the device 10 is defining or extending and adjusting the rule database 6 while the device 10 is being used.

According to certain embodiments of the present invention, the device 10 maps continuous sensor signals (or discrete sampled sensor signals) to sequences of events and achieving a compression of the data. Also, simple and efficient implementations for yielding the necessary segmentations are described in the present invention. The method described in the present invention is not solely restricted to the presented implementations of the time series segmentation, but can be modified within the scope of the appended claims.

As described in detail below, two efficient implementations of algorithms for the segmentation of time series data are contemplated. For the purpose of being able to describe these algorithmic procedures, notions of time series, segments and cost function are defined.

A time series s consists of N samples $x(1), x(2), \ldots, x(N)$. The notation $s(a,b)$ defines a segment of the series s, that is, the consecutive samples $x(a), x(a+1), \ldots ; x(b)$ where $a \leq b$. If $s_1 = s(a, b)$ and $s_2 = s(b+1, c)$ are two segments, then $s_1 s_2 = s(a,c)$ denotes their concatenation.

A k-segmentation S of s is a sequence $s_1 s_2 \ldots s_k$ of k segments such that $s_1 s_2 \ldots s_k = s$ and each $s_i$ is non-empty. In other words, there are segment boundaries $c_1, c_2, \ldots, c_{k-1}$, $0 < c_1 < c_2 < \ldots < c_{k-a} < N$, where $s_1 = s(1, c_1), s_2 = s(c_1+1, c_2), \ldots ; s_k = s(c_{k-1}+1, N)$, $c_0 = 0$ and $c_k = N$.

Only internally homogenous segmentations of time series are to be used. To describe this goal formally, a cost function F is associated with the internal heterogeneity of individual segments and is used to minimize the overall cost of the segmentation. Two assumptions are made on the overall cost. First, the cost $cost_F (s(a,b))$ of a single segment is a function of the data points and the number of data points $n = b - a + 1$. Accordingly:

$$cost_F(s(a,b)) = F(x; n | x \in s(a,b)).$$

Secondly, the cost of a k-segmentation $Cost_F(s_1 s_2 \ldots s_k)$ is the sum of the costs of its segments $s_1, s_2, \ldots, s_k$:

$$Cost_F(s_1 s_2 \ldots s_k) = \sum_{i=1}^{k} cost_F(s_k).$$

An optimal k-segmentation $S_F^{opt}(s;k)$ of time series s using cost function $cost_F$ is such that $Cost_F(s_1 s_2 \ldots s_k)$ is minimal among all possible k-segmentations. The cost function F may use the sum of variances of the components of the segment:

$$V(s(a,b)) = \sum_{i=1}^{d} \left[ \frac{1}{n} \sum_{i=a}^{b} x_i(i)^2 - \left( \frac{1}{n} \sum_{i=a}^{b} x_i(i) \right)^2 \right],$$

where $n = b - a + 1$ and d is the number dimensions. Thus the cost function for segmentations is $$Cost_V(s_1 s_2 \ldots s_k) = \frac{1}{n} \sum_{i=1}^{k} n_i V(s_i),$$

where the segments have length $n_1, n_2, \ldots, n_k$, the length N of the sequence is $$\sum_{i=1}^{k} n_i$$

and $V(s_i)$ is defined as above. Other cost functions are readily contemplated to be used with the present invention.

The problem to be solved is to find the segment boundaries $c_i$ that minimize the cost. For this end two efficient algorithms are described in the present invention.

A local iterative replacement (LIR) algorithm is a simple procedure where a new place for a breaking point constituting for a segment break point is selected optimally between the neighboring two break points (including the beginning and ending of the time series). The break points may be moved gradually towards better positions rather than to the locally optimal ones.

According to this LIR function, initial break points are selected heuristically, e.g. by using evenly spaced or random initial locations, or with a top-down method. A break point $C_i, 1 \leq i \leq k-1$ is then selected either in random or sequential order. The break point is then removed and the two consecutive segments that meet at $c_i$ are concatenated into $s(c_{i-1}+1, c_{i+1})$. Next, a new optimal location for the break point in the concatenated sequence is determined by locating an optimal 2-segmentation break point $c_i'$ for the concatenated segment and replacing the break point $c_i$ by $c_i'$ in the solution. Selection of the break point and determination of a new optimal location are then repeated until a predetermined stopping criterion is met (i.e. a cost is determined that is less than a predetermined threshold value).

In a global iterative replacement (GIR) algorithm, instead of relocating the break point $c_i$ between its neighbours $c_{i-1}$ and $c_{i+1}$, the best location is searched in the whole sequence. This includes clearly local iterative replacement but it may avoid some local minima. GIR makes one-at-a-time, optimal, split segment-merge segment pairs, and keeps the number of segments constant.

According to the GIR process, the initial segmentation $S_n = s_1 s_1 \ldots s_k; n = 0$ is set, as in LIR. A break point $c_i, 1 \leq i \leq k-1$ is selected either in random or sequential order, and then removed. The two consecutive segments that meet at $c_i$ are then concatenated into $\hat{s} = s(c_{i-1}+1, c_{i+1})$. Next, a new optimal location for a break point anywhere in the sequence is found by finding for each segment $s'_j$, $j=1,2, \ldots, k-1$ in the new segmentation $S' = s_1 s_2 \ldots s_{i-1} \hat{s} s_{i+2} \ldots s_k = s'_1 s'_2 \ldots s'_{k-1}$ the optimal 2-segmentation to $s'_{j1}$ and $S'_{j2}$, and computing the respective, potential savings $d_j = cost_F(s'_i) - (cost_F(s'_{j1}) + cost_F(s'_{j2}))$ in the segmentation cost. The split $s'_j$ with the largest savings $d_1$ is then selected and the break point is set at $d_1$, the new segmentation becoming $s'_1 s'_2 \ldots s'_{l1} s'_{l2} \ldots s'_{k-1}$. For $n = n+1$, the segments are renumerated for next round as $S_n = s_1 s_2 \ldots s_k = s'_1 s'_2 \ldots s'_{l1} s'_{l2} \ldots s'_{k-1}$. These steps are then repeated until stopping criterion is met, as in the LIR process.

A natural stopping criterion for the two above algorithms, LIR and GIR, is that the total cost cannot be decreased by any admissible move of a break point leading to a finite number of algorithm steps. Also the number of iterations can be limited in advance.

As an example of the use of the method described in the present invention and an application of the algorithms described above, FIG. 2 shows segmented sensor data collected from sensors 9 in different usage situations, showing clearly the transitions between non-overlapping and internally homogenous segments.

Figure 2:
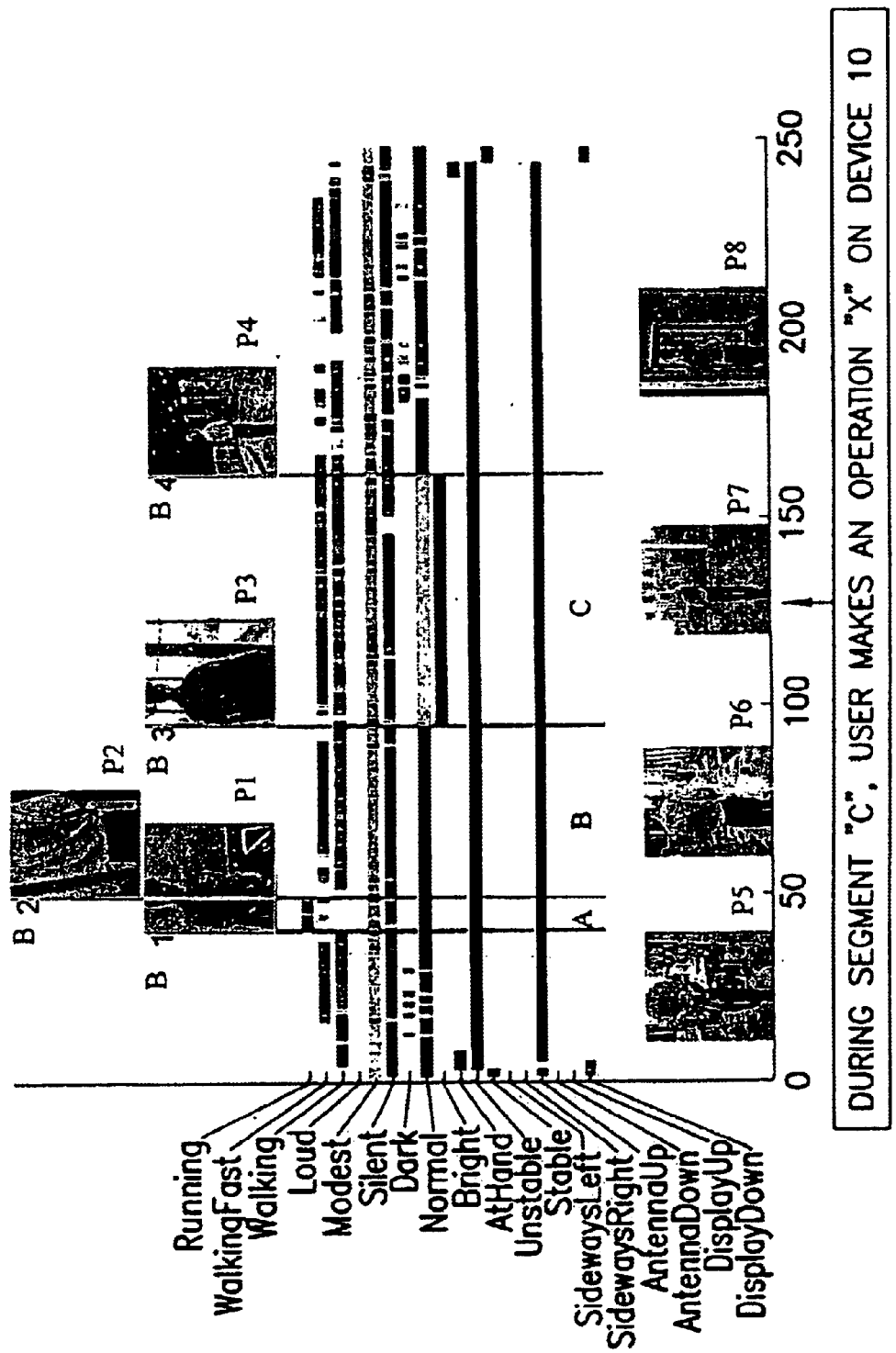
FIG. 2 depicts an exemplary correlation of user interaction with the device of FIG. 1 and data stored by the sensors of such device in a learning phase for determining a rule of use.

Turning now to FIG. 2, therein is displayed a chart displaying sensor data and user situations at identified points in time. The x-axis represents time (in seconds) and the sensor signal in time is pictured as a grey scale representation. The signals represent a motion status of the user (Running, WalkingFast, Walking), noise level (Loud, Modest, Silent), luminous intensity (Dark, Normal, Bright), location, general dynamic status or orientation 9(AtHand, Unstable, Stable, SidewaysLeft, SidewaysRight, AntennaUp, AntennaDown, DisplayUp, DisplayDown). In the grey scale signal representation, a darker grey color indicates a stronger signal and the lighter shades represent weaker signals. The signals are segmented according to the present invention, in any manner described above.

The vertical lines in FIG. 2 represent the borders B1–B4 which divide the time sequence into the three segments A, B, and C. The pictures P1–P4 show what is happening with the user at the segment borders of segments A, B and C: user going downstairs (P1), user exitting the stairway (P2), user exitting the building (P3) and user going inside the building (P4). Pictures P1 and P5–P8 show the usage situation during the different segments: before segment A the user is walking in the corridor (P5), user in the stairway (segment A, picture P1), user walking in the corridor (segment B, picture P6) and user walking outside (segment C, picture P7). After segment C the user is walking inside (P8). During segment C the user makes an operation X on the device.

In the present example, the sensor signal and corresponding user operations are represented as a sequence of segments: N1,N2, . . . ,A,B,C(X),M1,M2, . . . , where N1,N2, . . . represents segments that happened before segment A, and M1,M2, . . . are segments taking place after segment C. If a situation corresponding to the sequence of segments A, B and C and a user making an operation X on the device in segment C occurs often, a rule "after a sequence of segments A,B,C, initiate operation X" can be stored in the memory 7 of the device.

Figure 3:
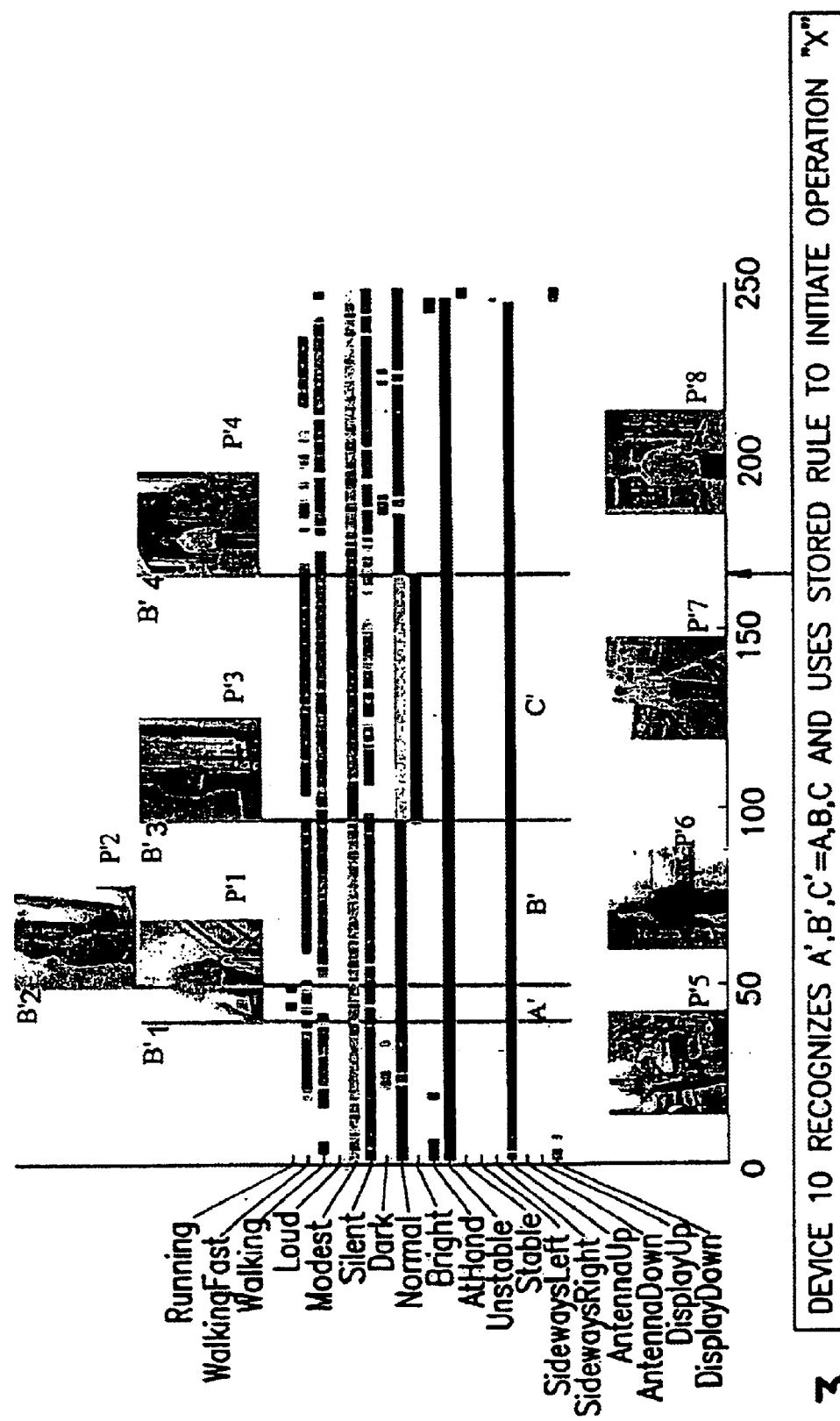
FIG. 3 depicts an exemplary situation in which the device will recognize a similar sensor pattern as in FIG. 2 and select the rule stored determined during the learning phase.

FIG. 3 shows segmented sensor data collected during a later usage phase of the device. The pictures P'1–P'4 show what is happening at the segment borders B'1–B'4 of segments A', B' and C'. Pictures P'1 and P'5–P'8 show the usage situation during the different segments. A sequence of segments A', B' and C'being the same as the previously found A, B and C are found and the previous rule can be used to initiate or predict an operation X.

Considerable advantages are achieved with the present invention when compared with prior solutions. The methods described in the present invention enable a mobile communication device to process sufficiently large amounts of sensor data, even in mobile devices with lesser processing power and limited memory resources, so that enough information of the context or external conditions of said device to make the device 10 context-aware to a feasible degree, thus simplifying its use while enabling new services to be offered to the user than in known mobile devices. The present invention is not solely restricted to the above presented embodiments and examples, but it can be modified within the spirit and scope of the appended claims.

What is claimed is:

1. A method for controlling a user interface of a mobile communication device having at least one sensor, the method comprising:

storing sensor signals indicative of a plurality of external conditions over a period of time;

segmenting said sensor signals into a time sequence of sensor data segments;

storing an indication of an operation performed by the user during at least one of said sensor data segments; and determining a rule for future operation, the rule corresponding to said sequence of sensor data segments and the operation.

2. The method of claim 1, wherein said rule corresponds to a change in a user interface of the mobile communication device.

3. The method of claim 1, wherein said mobile communication device is a mobile telephone.

4. The method of claim 1, wherein said external conditions include an acceleration, a noise level, a luminosity sensors and a humidity.

5. The method of claim 1, wherein said segmenting of sensor signals is performed substantially in real time with said storing the sensor signals.

6. The method of claim 1, wherein said segmenting of sensor signals is performed after a predetermined amount of said sensor signals are stored.

7. The method of claim 1, wherein said segmenting comprises time series segmentation of the sensor signals.

8. The method of claim 1, wherein said determining said rule includes downloading a rule from an external source.

9. The method of claim 1, wherein said storing the sensor signals comprises storing analog sensor data.

10. The method of claim 1, wherein said storing the sensor signals comprises storing digital sensor data.

11. The method of claim 1, wherein said determining said rule further comprises storing the rule in a rule database.

12. The method of claim 11, further comprising:

detecting a plurality of external conditions;

searching said rules database to find a rule matching the external conditions; and performing a function corresponding to the rule.

13. A mobile communication device, comprising:

at least one sensor for detecting a plurality of external conditions;

a display for presenting a user interface for selecting a plurality of operations;

a memory for storing a plurality of sensor signals from said at least one sensor, said sensor signals indicative of a plurality of external conditions over a period of time;

a processor for segmenting said sensor signals into a time sequence of sensor data segments;

the memory further for storing an indication of an operation performed by the user during at least one of said sensor data segments; and the processor further for determining a rule for modifying the user interface based on said sequence of sensor data segments and the operation.

14. A mobile communication device, comprising:

means for detecting a plurality of external conditions;

means for presenting a user interface for selecting a plurality of operations;

means for storing a plurality of sensor signals from said at least one sensor, said sensor signals indicative of a plurality of external conditions over a period of time;

means for segmenting said sensor signals into a time sequence of sensor data segments;

means for storing an indication of an operation performed by the user during at least one of said sensor data segments; and means for determining a rule for modifying the user interface based on said sequence of sensor data segments and the operation.

15. A computer-readable medium encoded with processing instructions for implementing a method performed by a mobile communication device having at least one sensor, the method comprising:

storing sensor signals indicative of a plurality of external conditions over a period of time;

segmenting said sensor signals into a time sequence of sensor data segments;

storing an indication of an operation performed by the user during at least one of said sensor data segments; and determining a rule for future operation, the rule corresponding to said sequence of sensor data segments and the operation.

16. The method of claim 1, wherein said sensor signals comprise at least one of: raw sensor data and pre-processed sensor data.

17. A method for controlling a user interface of a mobile communication device having at least one sensor, the method comprising:

storing sensor signals indicative of particular external conditions;

segmenting said sensor signals into a time sequence of sensor data segments;

storing an indication of an operation performed by the user during said particular external conditions; and if the operation is performed during a later occurence of the particular external conditions, determining a rule corresponding to the operation performed by the user and the particular external conditions.

18. The method of claim 17, wherein said rule corresponds to a change in a user interface of the mobile communication device.

19. The method of claim 17, wherein said mobile communication device is a mobile telephone.

20. The method of claim 17, wherein said particular external conditions include at least one of: an acceleration, a noise level, a luminosity sensors and a humidity.

21. The method of claim 17, wherein said segmenting of the sensor signals is performed substantially in real time with said storing the sensor signals.

22. The method of claim 17, wherein said segmenting of sensor signals is performed after a predetermined amount of the sensor signals are stored.

23. The method of claim 17, wherein said segmenting of sensor signals comprises time series segmentation of the sensor signals.

24. The method of claim 17, wherein said determining the rule includes downloading a rule from an external source.

25. The method of claim 17, wherein said storing the sensor signals comprises storing analog sensor data.

26. The method of claim 17, wherein said storing the sensor signals comprises storing digital sensor data.

27. The method of claim 17, wherein said determining the rule further comprises storing the rule in a rule database.

28. The method of claim 27, further comprising:

detecting a plurality of external conditions;

searching said rules database to find a rule matching the external conditions; and performing a function corresponding to the rule.

29. The method of claim 17, wherein said sensor signals comprise at least one of:

raw sensor data and pre-processed sensor data.

30. A mobile communication device, comprising:

means for storing sensor signals indicative of particular external conditions;

means for segmenting said sensor signals into a time sequence of sensor data segments;

means for storing an indication of an operation performed by the user during said particular external conditions; and means for determining a rule corresponding to the operation performed by the user and the particular external conditions, if the operation is performed during a later occurence of the particular external conditions.

31. A mobile communication device, comprising:

at least one sensor for detecting a plurality of external conditions;

a display for presenting a user interface for selecting a plurality of operations;

a memory for storing sensor signals indicative of particular external conditions;

a processor for segmenting said sensor signals into a time sequence of sensor data segments;

the memory further for storing an indication of an operation performed by the user during said particular external conditions; and the processor further for determining a rule corresponding to the operation performed by the user and the particular external, conditions if the operation is performed during a later occurence of the particular external conditions.

32. A computer-readable medium encoded with processing instructions for implementing a method performed by a mobile communication device having at least one sensor, the method comprising:

storing sensor signals indicative of particular external conditions;

segmenting said sensor signals into a time sequence of sensor data segments;

storing an indication of an operation performed by the user during said particular external conditions; and determining a rule corresponding to the operation performed by the user and the particular external, conditions if the operation is performed during a later occurence of the particular external conditions.

33. A method for controlling a user interface of a mobile communication device having at least one sensor, the method comprising:

storing sensor signals indicative of a plurality of external conditions over a period of time;

segmenting said sensor signals into a time sequence of sensor data segments;

storing an indication of a plurality of operations performed by the user during at least one of said sensor data segments; and determining a rule for future operation, the rule corresponding to said sequence of sensor data segments and the plurality of operations.

34. A method for controlling a user interface of a mobile communication device having at least one sensor, the method comprising:

storing sensor signals indicative of particular external conditions;

segmenting said sensor signals into a time sequence of sensor data segments;

storing at least one indication of a plurality of operations performed by the user during said particular external conditions; and if the plurality of operations are performed during a later occurence of the particular external conditions, determining a rule corresponding to the plurality of operations performed by the user and the particular external conditions.

35. The method of claim 7 wherein the segments are non-overlapping and internally homogeneous.

36. The method of claim 1 further comprising:

detecting a rule associated with a sequence of sensor data segments that matches a sequence of sensor data segments generated in response to a newly detected plurality of external conditions; and performing an operation corresponding to the rule.

37. A method for controlling a user interface of a mobile communication device having at least one sensor, the method comprising:

storing each of a plurality of sensor signals each indicative of an external condition over a period of time;

segmenting each of said plurality of sensor signals into a sequence of time segments, wherein the sequence of the time segments is the same for each of the plurality of sensor signals;

storing an indication of an operation performed by the user during at least one of said time segments; and determining a rule for future operation, the rule corresponding to a duration of each of said time segments and the operation.

* * * * *